(12) United States Patent
Baek et al.

(10) Patent No.: US 11,962,832 B2
(45) Date of Patent: Apr. 16, 2024

(54) DISPLAY DEVICE, REMOTE CONTROL DEVICE AND DISPLAY SYSTEM INCLUDING DISPLAY DEVICE AND REMOTE CONTROL DEVICE

(71) Applicant: LG ELECTRONICS INC., Seoul (KR)

(72) Inventors: Sanghyun Baek, Seoul (KR); Gwanhui Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/943,009

(22) Filed: Sep. 12, 2022

(65) Prior Publication Data

US 2023/0254526 A1 Aug. 10, 2023

(30) Foreign Application Priority Data

Feb. 28, 2022 (WO) ................ PCT/KR2022/002843

(51) Int. Cl.
*H04N 21/422* (2011.01)
*H04N 21/4363* (2011.01)

(52) U.S. Cl.
CPC . *H04N 21/42221* (2013.01); *H04N 21/42226* (2013.01); *H04N 21/43637* (2013.01)

(58) Field of Classification Search
CPC ....... H04N 21/42221; H04N 21/42226; H04N 21/43637
USPC ......................................................... 348/734
See application file for complete search history.

(56) References Cited

U.S. PATENT DOCUMENTS

| | | | |
|---|---|---|---|
| 9,763,275 B2 * | 9/2017 | Park | H04W 4/80 |
| 2012/0169932 A1 * | 7/2012 | Kim | H04N 21/42204 |
| | | | 348/E5.103 |
| 2015/0065119 A1 | 3/2015 | de Clercq et al. | |
| 2016/0072638 A1 * | 3/2016 | Amer | F24F 11/62 |
| | | | 398/106 |
| 2016/0358461 A1 | 12/2016 | Patel et al. | |
| 2017/0187957 A1 * | 6/2017 | Iwaizumi | H04N 7/142 |
| 2021/0297539 A1 * | 9/2021 | Yoshida | H04N 1/00395 |

(Continued)

FOREIGN PATENT DOCUMENTS

| KR | 1020200037567 | 4/2020 |
|---|---|---|
| KR | 1020210027920 | 3/2021 |
| KR | 102355228 | 2/2022 |

OTHER PUBLICATIONS

PCT International Application No. PCT/KR2022/002843, International Search Report dated Nov. 18, 2022, 5 pages.

*Primary Examiner* — John W Miller
*Assistant Examiner* — Omer Khalid
(74) *Attorney, Agent, or Firm* — LEE, HONG, DEGERMAN, KANG & WAIMEY

(57) ABSTRACT

According to an embodiment of the present disclosure, a remote control device for transmitting and receiving a control signal to and from a display device may include a Bluetooth circuit configured to establish Bluetooth connection with the display device, an IR circuit configured to output an IR signal, and a controller configured to output an IR signal for controlling the display device or an external device connected to the display device based on information on a video input mode of the display device when Bluetooth connection with the display device is not established.

10 Claims, 13 Drawing Sheets

(56) References Cited

U.S. PATENT DOCUMENTS

2021/0327326 A1* 10/2021 Kwon .............. H04N 21/41265
2022/0319389 A1* 10/2022 Yi .......................... G09G 5/005

* cited by examiner

Num1:1
Num2:2

...

Ch-up:10
Ch-down:11
Prev:12
Up:13
Down:14
Left:15
Right:16

...

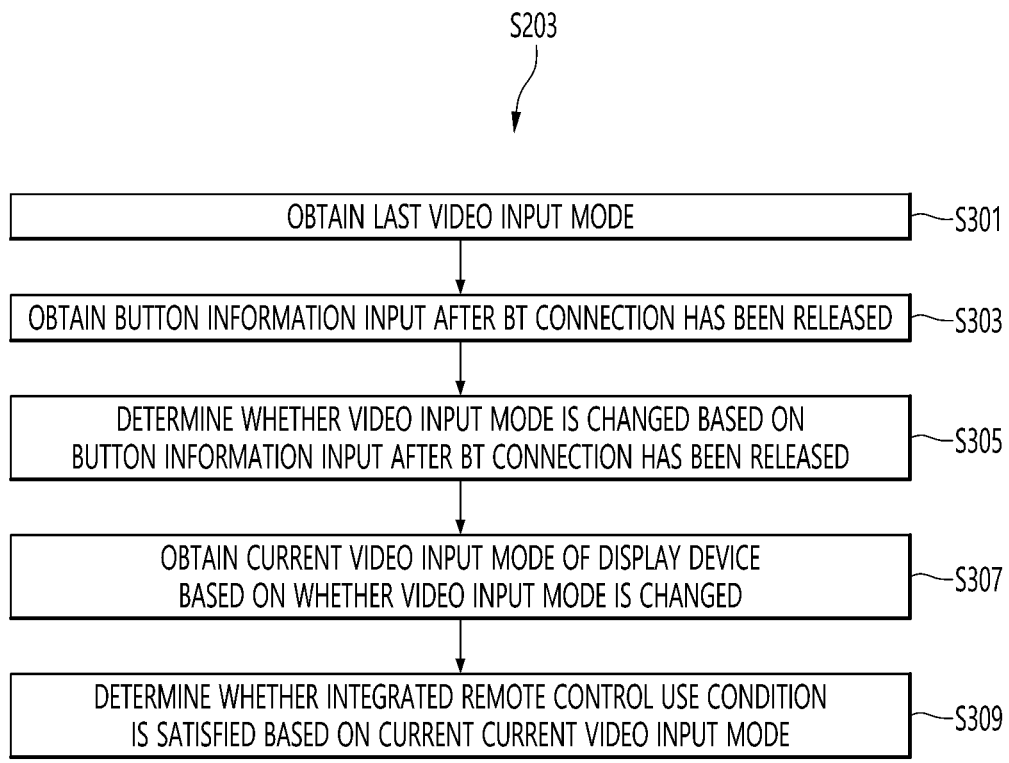
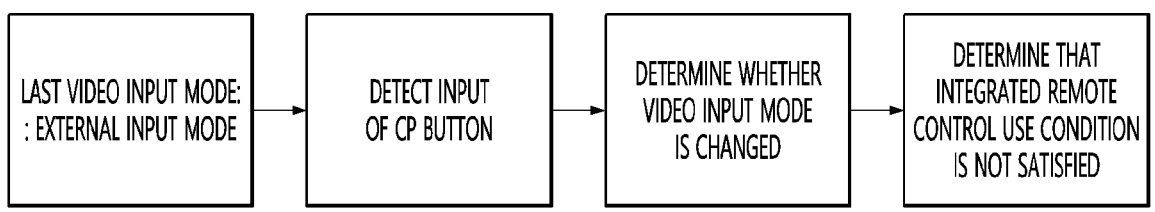

DISPLAY DEVICE, REMOTE CONTROL DEVICE AND DISPLAY SYSTEM INCLUDING DISPLAY DEVICE AND REMOTE CONTROL DEVICE

CROSS-REFERENCE TO RELATED APPLICATIONS

Pursuant to 35 U.S.C. § 119, this application claims the benefit of an earlier filing date and right of priority to International Application No. PCT/KR2022/002843, filed on Feb. 28, 2022, the contents of which is hereby incorporated by reference herein in its entirety.

BACKGROUND OF THE INVENTION

1. Field of the Invention

The present disclosure relates to a display device, a remote control device, and a display system including the display device and the remote control device. More particularly, the present disclosure relates to a remote control device for controlling both a display device and an external device connected to the display device.

2. DISCUSSION OF THE RELATED ART

Recently, the number of users who view more diverse images through external devices such as set-top boxes and DVD players in addition to videos provided by the display device itself has increased. Accordingly, the users require a separate remote control device to control not only the display device but also the external device. That is, the users are inconvenient to separately employ and use a remote control device for controlling the display device itself, a remote control device for controlling a set-top box, and a remote control device for controlling a DVD player.

Accordingly, the display device has provided an integrated remote control function. The integrated remote control function is a function that enables a user to control multiple devices with one remote control device.

For example, when at least one button is input, the remote control device transmits information on the input button to the display device, the display device may identify a target device that the user wants to control through the remote control device, and transmit IR information for controlling the target device to the remote control. When receiving the IR information, the remote control device may control the target device by outputting an IR signal according to the IR information.

In this case, the remote control device is connected to the display device via Bluetooth to transmit and receive signals. When wireless signal environment is unstable, the remote control device cannot receive the IR information and thus cannot output an IR signal, thus causing a problem that the target device does not work even when the user has pressed a button of the remote control device.

In order to resolve this problem, when the wireless signal environment is unstable, the remote control device does not transmit and receive signals to and from the display device through Bluetooth, and directly outputs an IR signal for controlling the display device. However, the remote control device cannot output an IR signal for controlling the external device even when using the above-described method when the wireless signal environment is unstable, thereby making it hard to control the external device.

SUMMARY OF THE INVENTION

An object of the present disclosure is to provide a remote control device and a display system capable of allowing an integrated remote control function to operate normally regardless of a wireless signal environment.

An object of the present disclosure is to provide a remote control device and a display system capable of controlling a display device and an external device connected to the display device regardless of a wireless signal environment.

A remote control device for transmitting and receiving a control signal to and from a display device according to an embodiment of present disclosure comprises a Bluetooth circuit configured to establish Bluetooth connection with the display device, an IR circuit configured to output an IR signal, and a controller configured to output an IR signal for controlling the display device or an external device connected to the display device based on information on a video input mode of the display device when Bluetooth connection with the display device is not established.

The controller is configured to output an IR signal for controlling the external device when the video input mode of the display device is an external input mode.

The remote control device further comprises a memory configured to store index information in which IR information on the external device and buttons are respectively mapped to IR keys of the IR information.

The controller is configured to obtain an IR key corresponding to an input button from the IR information based on the index information and output the IR signal according to the IR key when the video input mode of the display device is the external input mode while the Bluetooth connection with the display device is not established.

The controller is configured to output an IR signal for controlling the display device when the video input mode of the display device is not an external input mode.

The controller is configured to transmit information on an input button to the display device when Bluetooth connection with the display device is established and output the IR signal according to a received IR key when the IR key corresponding to the input button is received.

The controller is configured to obtain a current video input mode of the display device based on a button input history when the Bluetooth connection with the display device is not established.

The controller is configured to obtain a last video input mode based on the information on the video input mode most recently received from the display device, obtain whether the video input mode is changed based on the button input history, and obtain a current video input mode of the display device based on whether the video input mode is changed.

The controller is configured to calculate a direction-key weight based on the button input history, and obtain whether the video input mode is changed based on the direction-key weight.

A display system according to an embodiment of present disclosure comprises a display device, and a remote control device configured to transmit and receive a control signal to and from a display device, wherein the remote control device is configured to output an IR signal for controlling the display device or an external device connected to the display device based on information on a video input mode of the display device when Bluetooth connection with the display device is not established.

The remote control device is configured to output an IR signal for controlling the external device when the video input mode of the display device is an external input mode.

The display device is configured to transmit, to the remote control device, index information in which IR information on the external device and buttons are respectively mapped to IR keys of the IR information.

The remote control device is configured to obtain an IR key corresponding to an input button from the IR information based on the index information and output the IR signal according to the IR key when the video input mode of the display device is the external input mode while the Bluetooth connection with the display device is not established.

The remote control device is configured to output an IR signal for controlling the display device when the video input mode of the display device is not an external input mode.

The remote control device is configured to transmit information on an input button to the display device when Bluetooth connection with the display device is established, wherein the display device is configured to transmit an IR key corresponding to the input button to the remote control device based on the information on the input button, and wherein the remote control device is configured to output the IR signal according to a received IR key when the IR key is received.

BRIEF DESCRIPTION OF THE DRAWINGS

FIG. 8 is a diagram illustrating an example of IR information according to an embodiment of the present disclosure.

FIG. 9 is a diagram illustrating an example of index information according to an embodiment of the present disclosure.

FIG. 11 is a flowchart illustrating a method for a remote control device to determine whether an integrated remote control use condition is satisfied according to a video input mode of a display device according to an embodiment of the present disclosure.

FIG. 12 is a diagram illustrating a first example in which a remote control device determines whether a video input mode is changed and whether an integrated remote control use condition is satisfied based on a button input history, according to an embodiment of the present disclosure.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
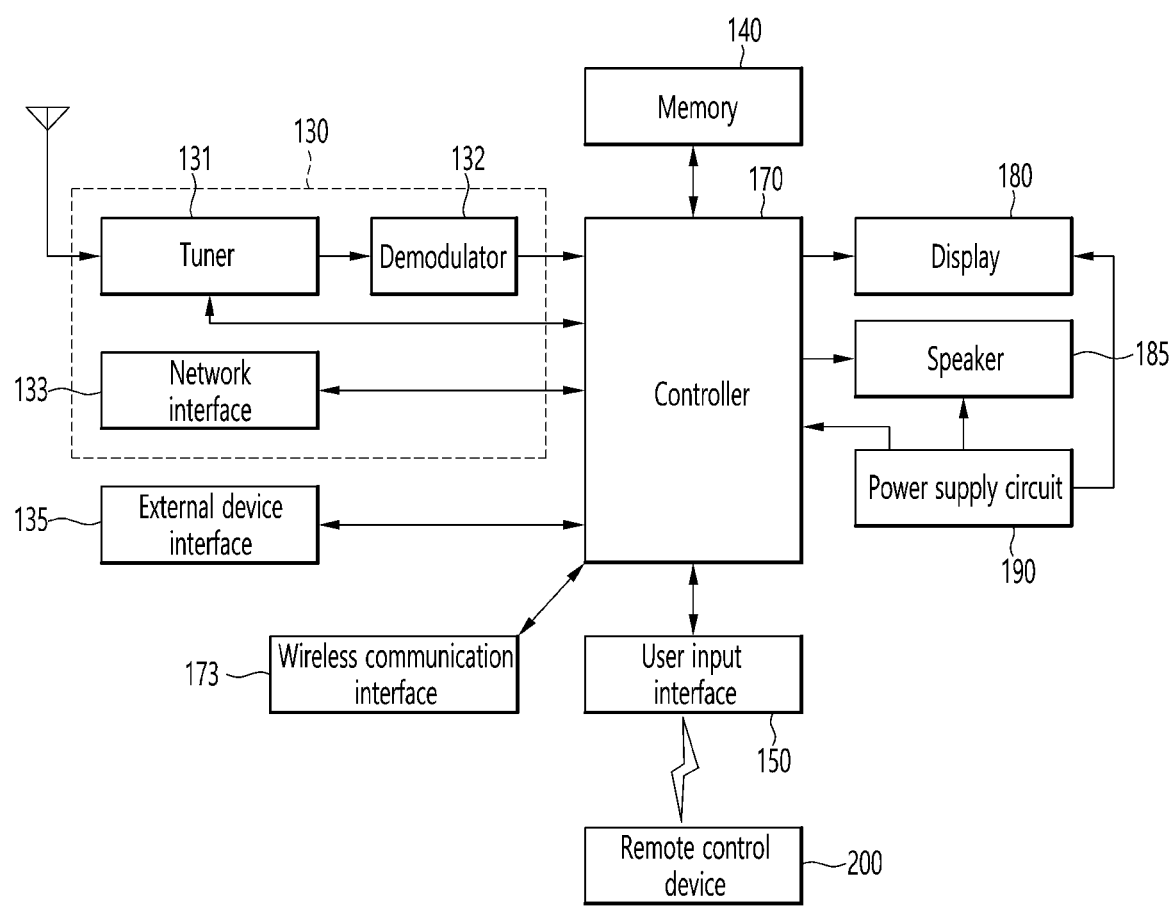
FIG. 1 is a block diagram showing a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi(Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 the audio output unit 185.

Next, a remote control device according to an embodiment of the present disclosure will be described with reference to FIGS. 2 to 3.

Figure 2:
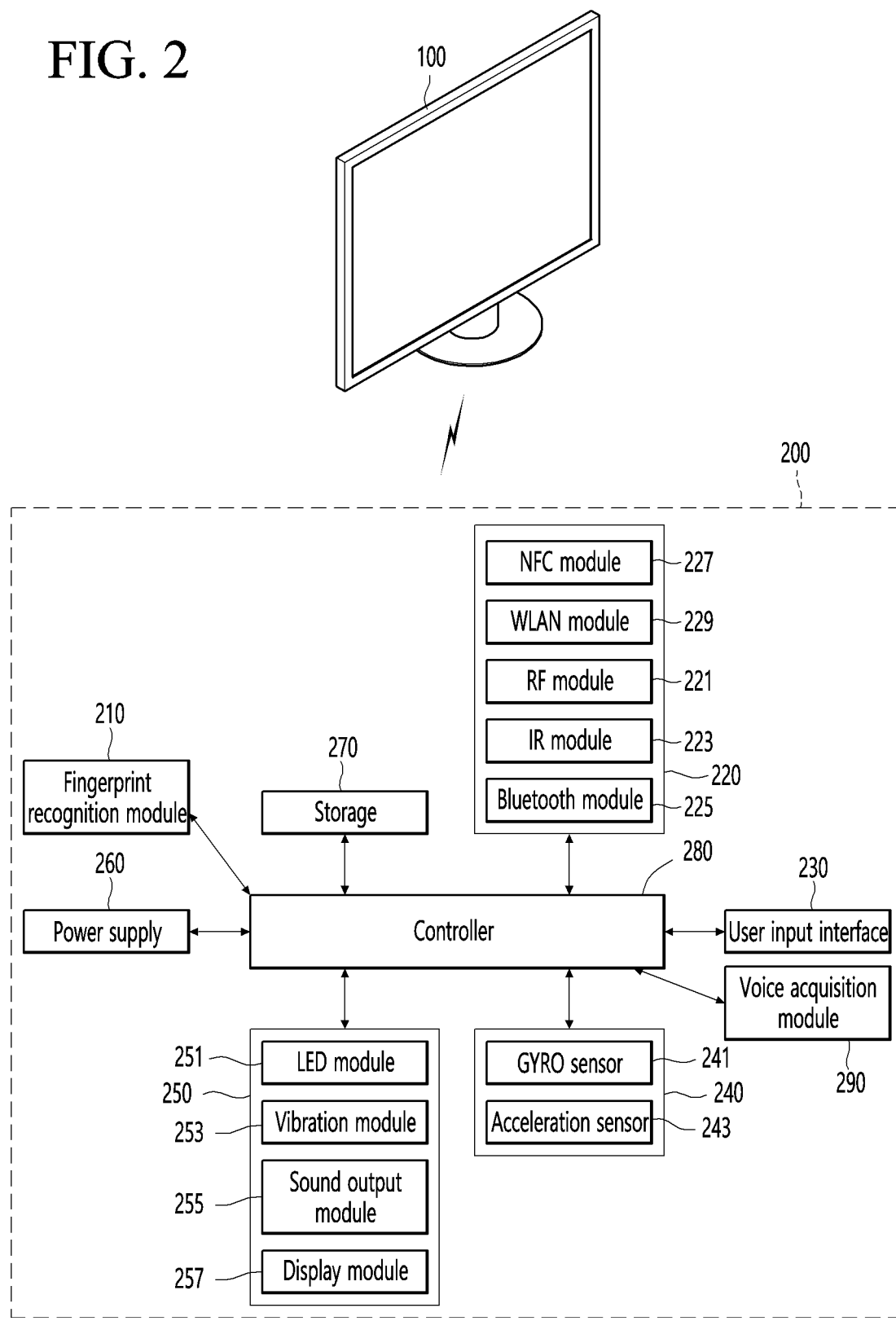
FIG. 2 is a block diagram of a remote control device according to an embodiment of the present disclosure.
Figure 3:
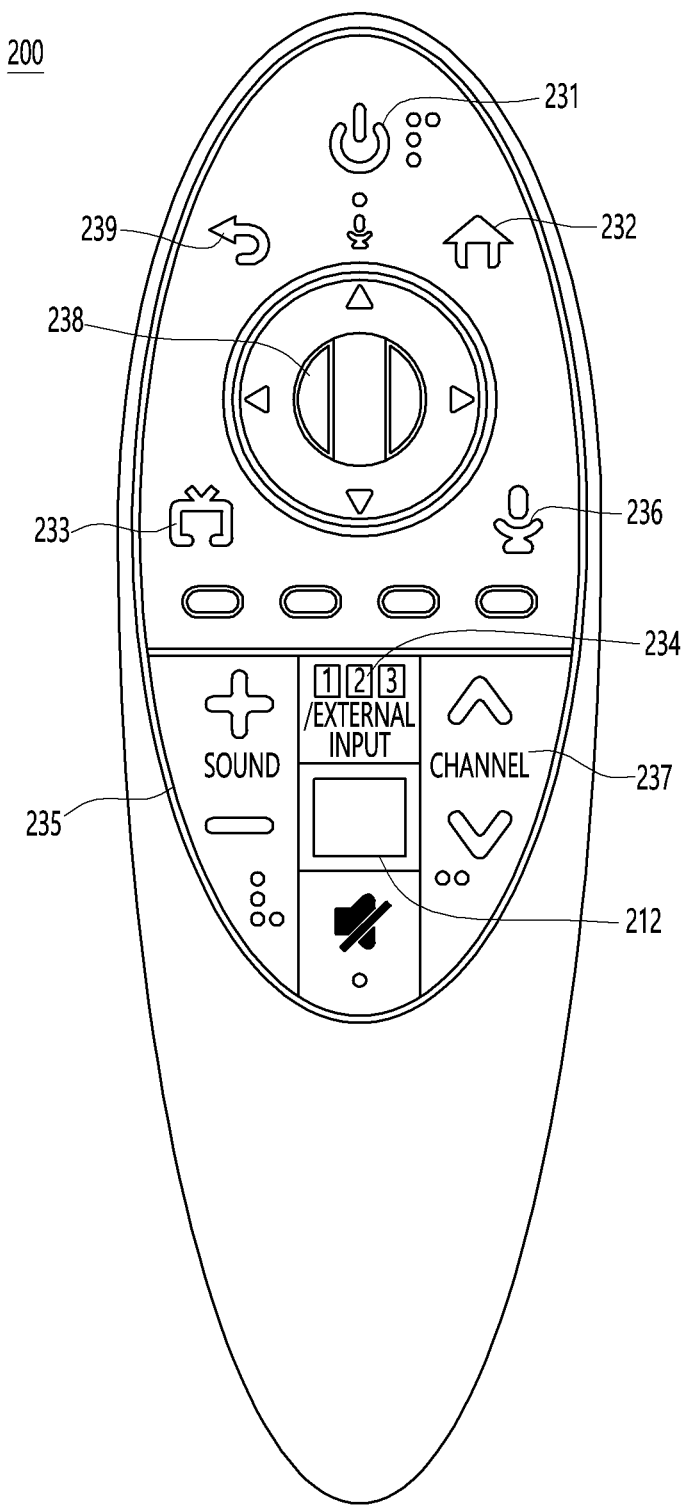
FIG. 3 shows an actual configuration example of a remote control device according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, a description will be given referring to FIG. 4.

Figure 4:
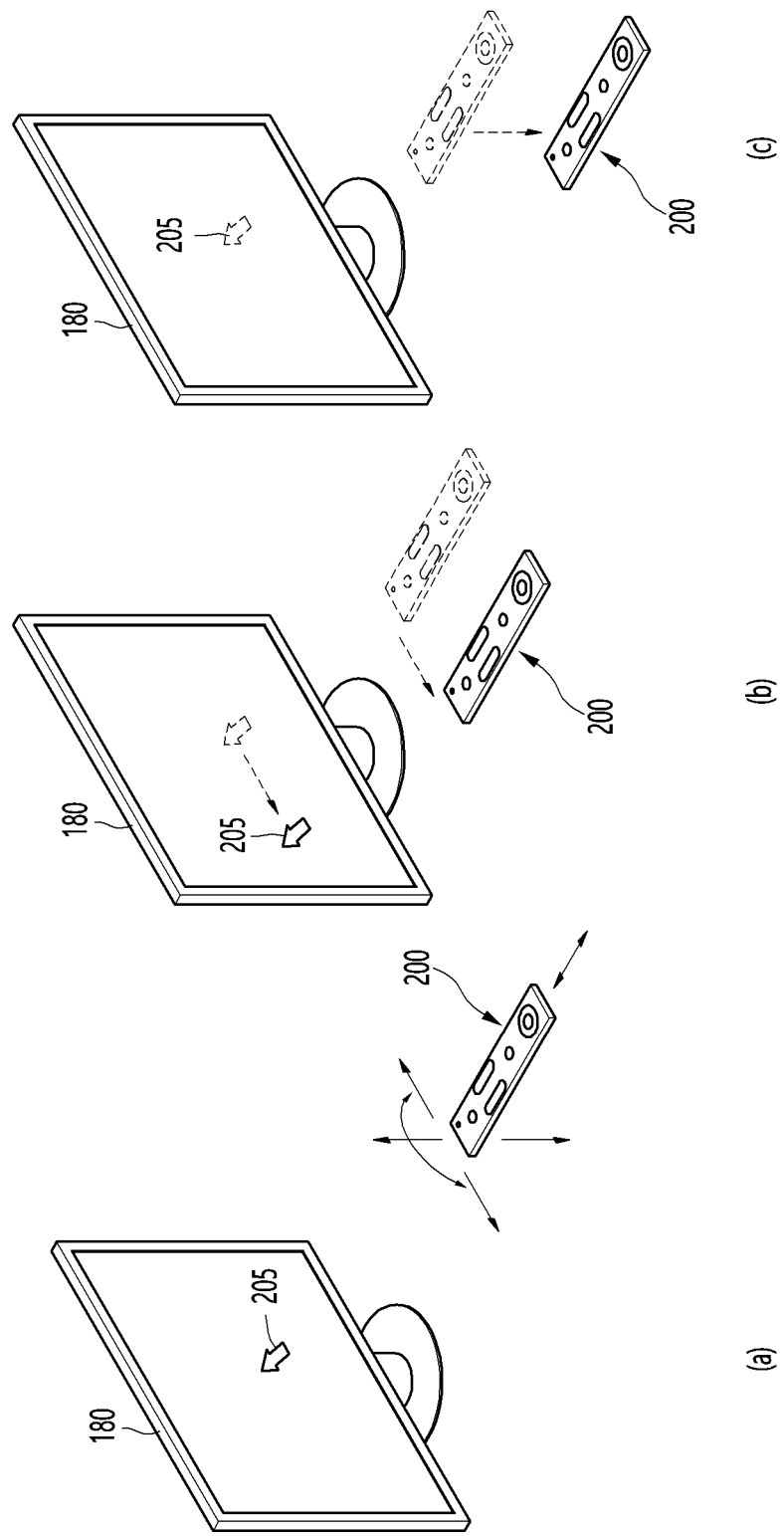
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5:
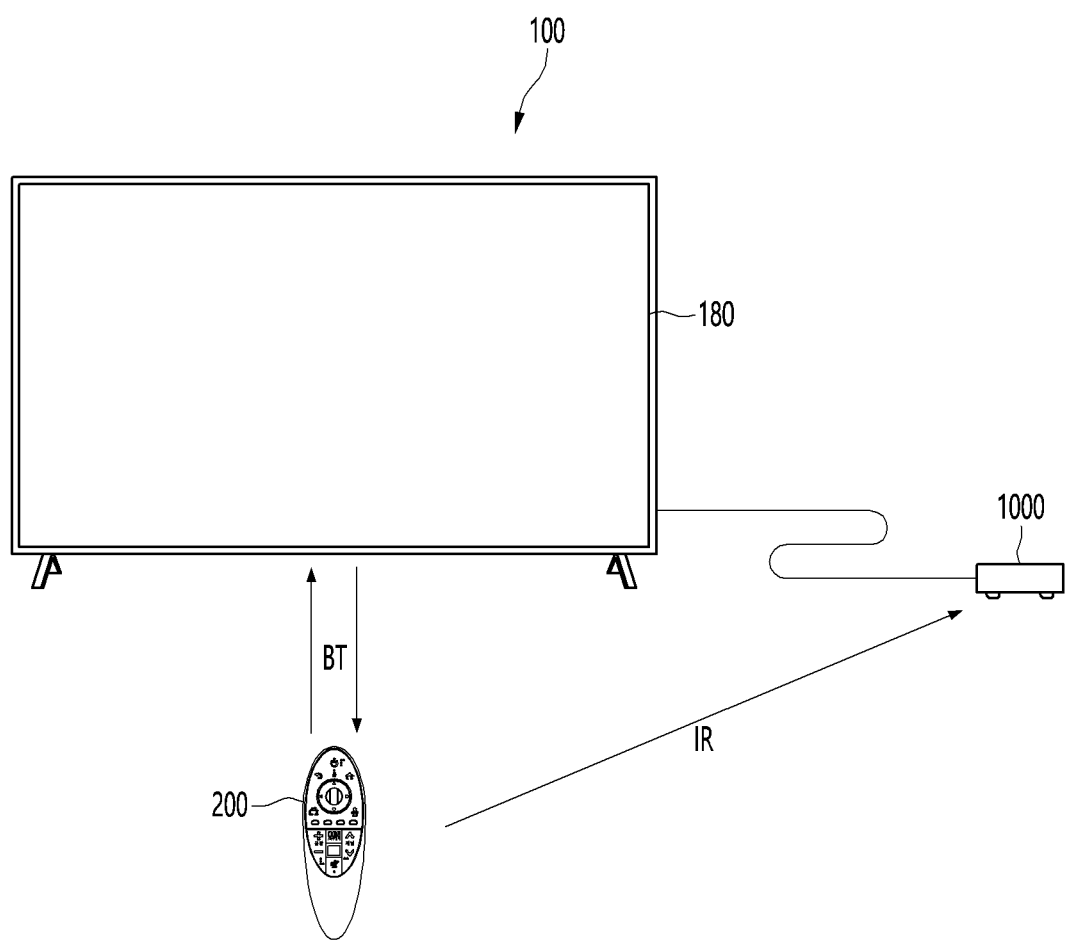
FIG. 5 is a diagram illustrating an integrated remote control function of a display system according to an embodiment of the present disclosure.

FIG. 5 is a diagram illustrating an integrated remote control function of a display system according to an embodiment of the present disclosure.

The integrated remote control function refers to a function that enables controlling of not only the display device 100 but also an external device 1000 connected to the display device 100 using one remote control device 200.

In the case of using the integrated remote control function, when at least one button is input, the remote control device 200 may transmit information on the input button to the display device 100 through Bluetooth (BT). To this end, the remote control device 200 may include a Bluetooth circuit 225 for connecting to the display device 100 through Bluetooth.

The display device 100 may receive button information from the remote control device 200, and the button information may mean information about a button input to the remote control device 200. The controller 170 of the display device 100 may determine a target device to be controlled according to button information.

The controller 170 may determine a target device to be controlled according to a video input mode. The controller 170 may determine an external device as the target device when the video input mode is an external input mode, and may determine the display device 100 itself as the target device when the video input mode is not the external input mode.

Meanwhile, the controller 170 may determine a target device to be controlled based on the button information according to the video input mode. Here, the video input mode may refer to an operation mode for receiving a video and displaying the video on the display 180. The video input mode may be set to the external input mode. When the video input mode is the external input mode, the controller 170 may receive a video from an external device through HDMI or the like and display the video on the display 180.

The video input mode may not be set to the external input mode. For example, the video input mode may be set to a TV input mode. When the video input mode is not the external input mode, the controller 170 may receive a video through the tuner 131, the network interface 133, and the like and display the video on the display 180.

When the target device is the display device 100 itself, the controller 170 may control the display device 100 according to the button information. However, when the target device is the external device 1000, the controller 170 may transmit an IR key for controlling the external device 100 to the remote control device 200 according to button information. In particular, the controller 170 may transmit the IR key for controlling the external device 100 to the remote control device 200 through Bluetooth.

When receiving the IR key from the display device 100, the remote control device 200 may control the external device 1000 by outputting an IR signal according to the IR key. To this end, the remote control device 200 may include an IR circuit 223 for outputting an IR signal.

Accordingly, the user may control the display device 100 or the external device 1000 with only the remote control device 200. That is, it is not necessary to separately provide a device for controlling the display device 100 and a device for controlling the external device 1000.

However, since the remote control device 200 is connected to the display device 100 through Bluetooth to transmit and receive information, there is a problem in that it cannot control the external device 1000 when Bluetooth connection is released. In particular, as there are the more wireless communication devices such as Bluetooth and Wi-Fi in the vicinity, the more cases frequently occur in which a Bluetooth connection between the display device 100 and the remote control device 200 is not smooth.

Figure 6:
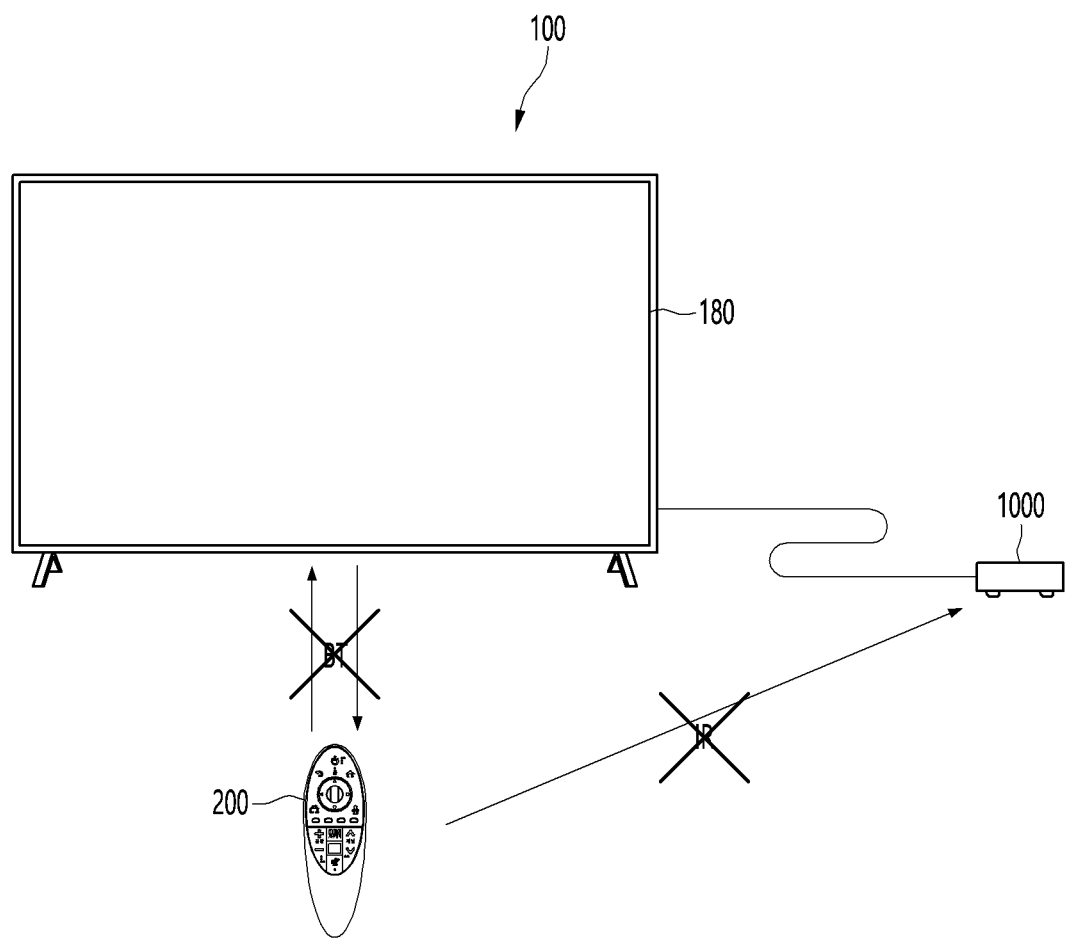
FIG. 6 is a diagram illustrating an operation state of a display system in a poor wireless environment according to an embodiment of the present disclosure.

FIG. 6 is a diagram illustrating an operation state of a display system in a poor wireless environment according to an embodiment of the present disclosure.

When the wireless environment is poor, the remote control device 200 may not be connected to the display device 100 through Bluetooth. In this case, the remote control device 200 may not transmit button information to the display device 100, or may not receive an IR key according to the button information from the display device 100 even when the button information has been transmitted.

When the remote control device 200 does not receive the IR key, the remote control device 200 may output an IR signal for controlling the display device 100 according to the button information. Since the display device 100 operates according to the output IR signal, if the current input video is a video input through the tuner 131, the network interface 133, or the like, a normal operation may be performed according to the button input to the remote control device 200. However, since the external device 1000 does not operate according to the IR signal for controlling the display device 100, if the video input mode is an external input mode, there is a problem in which a normal operation is unable to be performed according to the button input to the remote control device 200.

That is, there is a need for a method for resolving the problem that the integrated remote control function does not operate normally when the wireless environment is poor. In particular, there is a need for a method in which the remote control device 200 is able to control the external device 1000 even when the wireless environment is poor.

Accordingly, when the remote control device 200 according to an embodiment of the present disclosure is not connected to the display device 100 through Bluetooth, the display device 100 may output an IR signal for controlling the display device 100 or the external device 1000 connected to the display device 100 based on video information of the display device 100 currently being displayed. Details will be described below.

Figure 7:
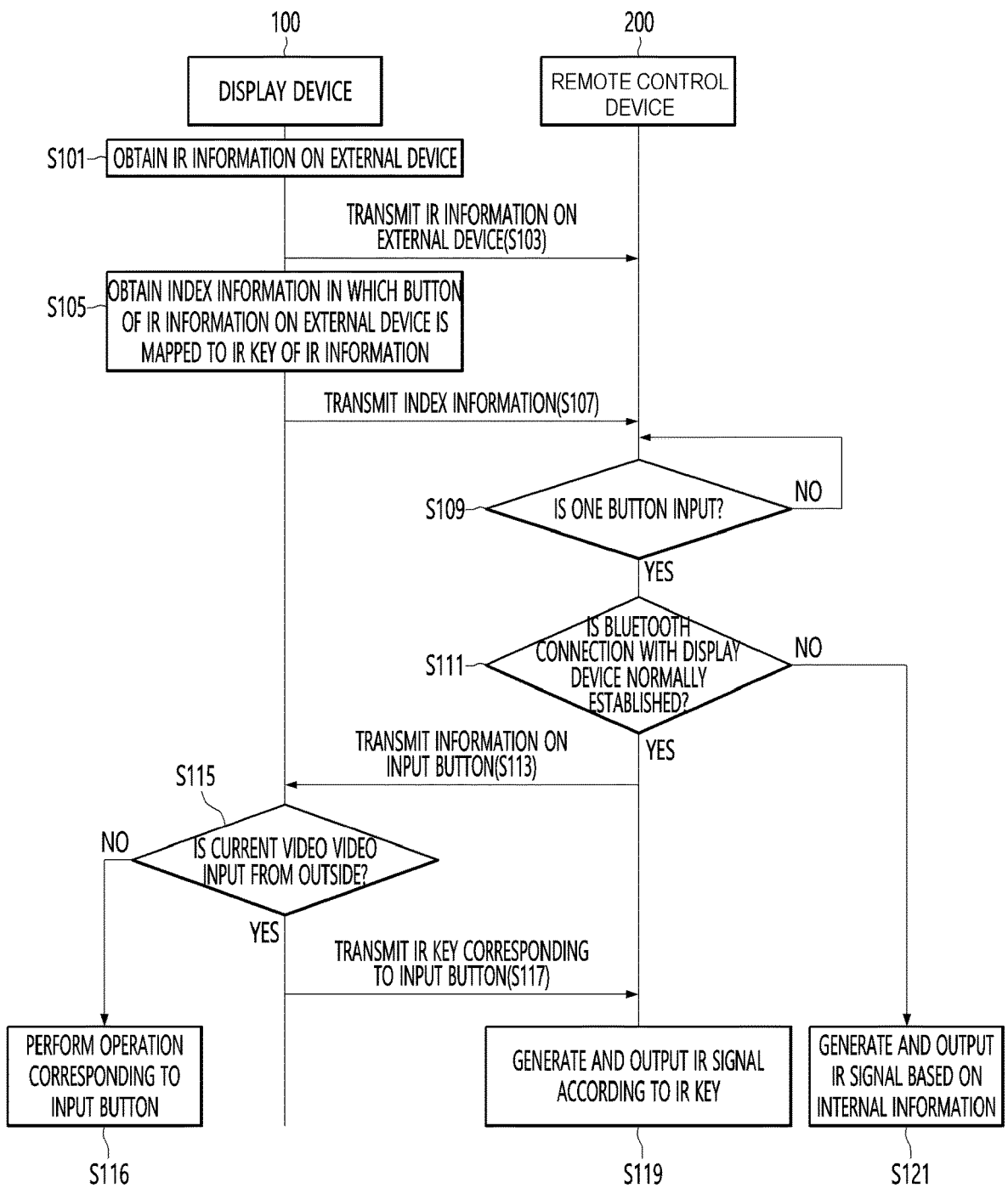
FIG. 7 is a flowchart illustrating a method for operating a display system to provide an integrated remote control function that operates regardless of a wireless environment according to an embodiment of the present disclosure.

FIG. 7 is a flowchart illustrating a method for operating a display system to provide an integrated remote control function that operates regardless of a wireless environment according to an embodiment of the present disclosure.

The remote control device 200 may store IR information on the external device 1000 and index information in which each button is mapped to an IR key of the IR information in advance in the memory 270.

The memory 270 may store IR information and index information when the remote control device 200 is manufactured. Alternatively, the memory 270 may receive and store IR information and index information from the display device 100. In this specification, it is assumed that the remote control device 200 receives and stores IR information and index information from the display device 100.

Referring to FIG. 7, the display device 100 may obtain IR information on an external device (S101).

The IR information on the external device may include an IR key for controlling a corresponding external device. For example, the IR information on an external device may include an IR key for outputting an IR signal for increasing volume, an IR key for outputting an IR signal for decreasing volume, an IR key for outputting an IR signal for inputting button "1", and the like.

Meanwhile, the IR information may be different for types of external devices. For example, a first IR signal for increasing the volume of a first external device may be different from a second IR signal for increasing the volume of a second external device, and accordingly, a first IR key for generating the first IR signal may be different from a second IR key for generating the second IR signal. Accordingly, the display device 100 may obtain IR information on each external device for types of external devices. According to an embodiment, when an external device is first connected to the external device interface 135, the controller 170 may obtain IR information on the connected external device. However, since this is only an example, there are various timings and methods for the display device 100 to obtain IR information on an external device.

When the controller 170 obtains IR information on an external device, the controller 170 may control the wireless communication interface 173 to transmit the IR information on an external device to the remote control device 200 through Bluetooth (S103).

The remote control device 200 may receive the IR information on an external device from the display device 100, and store the received IR information in the memory 270.

In addition, the display device 100 may obtain index information in which a button of the remote control device 200 is mapped to an IR key of the IR information (S105).

Specifically, the controller 170 may generate index information in which each button provided in the remote control device 200 is mapped to an IR key for performing control to perform an operation corresponding to the input button when each button is input. A method of generating index information will be described with reference to FIGS. 8 and 9.

FIG. 8 is a diagram illustrating an example of IR information according to an embodiment of the present disclosure, and FIG. 9 is a diagram illustrating an example of index information according to an embodiment of the present disclosure.

The example of FIG. 8 may represent IR information on a first external device. The IR information on the first external device may include a first IR key (1) for inputting button "1" (0x11 0x21 0x31), a second IR key (2) for inputting button "2" (0x12 0x22 0x32), a third IR key (3) for inputting button "3" (0x13, 0x23, 0x33), . . . , a tenth IR key (10) for switching to a next higher channel (0x11 0x22 0x33), and the like.

In this case, the index information may include index "1" for mapping button "1" with the first IR key, index "2" for mapping button "2" with the second IR key, index "3" for mapping button "3" with the third IR key, . . . , index "10" for mapping a channel-up button with the tenth IR key, index "11" for mapping a channel-down button with the eleventh IR key, and the like. Here, numbers are used as the indexes, but they are only examples, and letters or the like, such as the alphabet capable of mapping each IR key and each button of the remote control device 200, may be used.

The controller 170 may obtain the index information by creating a table in which each button provided in the remote control device 200 is mapped to an IR key of IR information. On the other hand, the format of the index information is not limited to the table, and various formats may be used.

The controller 170 may generate index information for each type of an external device.

When the controller 170 obtains the index information, the controller 170 may control the wireless communication interface 173 to transmit the obtained index information to the remote control device 200 through Bluetooth (S107).

The remote control device 200 may receive the index information from the display device 100 and store the received index information in the memory 270.

The controller 280 of the remote control device 200 may detect whether one button is input (S109).

That is, the controller 280 may determine whether at least one button provided in the remote control device 200 is input.

When the input of one button is not detected, the controller 280 may continuously detect whether one button is input.

When the input of one button is detected, the controller 280 may determine whether the display device 100 is normally connected through Bluetooth (S111).

That is, when the input of one button is sensed, the controller 280 may determine whether Bluetooth connection with the display device 100 is established.

When the remote control device 200 is connected to the display device 100 via Bluetooth, the controller 280 may transmit information on the input button to the display device 100 (S113).

When the controller 170 of the display device 100 receives the information on the input button from the remote control device 200, the controller 170 may determine whether a current video is a video input from the outside (S115).

That is, when the controller 170 receives the information on the button input from the remote control device 200, the controller 170 may determine whether the current input video is a video received through the external device interface 135. In other words, when receiving the information on the button input from the remote control device 200, the controller 170 may determine whether the current video input mode is the external input mode.

When the current video is not a video input from an external device, the controller 170 may perform an operation corresponding to the input button (S116).

That is, when the current video input mode is not the external input mode, the controller 170 may perform the operation corresponding to the input button.

When the current video is a video input from an external device, the controller 170 may control the wireless communication interface 173 to transmit an IR key corresponding to the input button to the remote control device 200 (S117).

That is, when the current video input mode is the external input mode, the controller 170 may control the wireless communication interface 173 to transmit the IR key corresponding to the input button to the remote control device 200.

When receiving the IR key, the controller 170 of the remote control device 200 may generate and output an IR signal according to the IR key (S119).

Meanwhile, determining whether the current video is a video input from an external device, that is, determining whether the current video input mode is the external input mode as described above may be the same as determining whether an integrated remote control use condition is satisfied. That is, a condition that the current video is a video input from an external device, that is, a condition that the current video input mode is the external input mode may correspond to the integrated remote control use condition, and a condition that the current video is not a video input from an external device, that is, a condition that the current video input mode is not the external input mode may not correspond to the integrated remote control use condition. The fact that the current video is not a video input from an external device may mean that the current video is directly input by the display device 100 such as the tuner 131 and the network interface 133, which may not correspond to the integrated remote control use condition.

Meanwhile, in step S111, when Bluetooth connection with the display device 100 is not established, the controller 280 may generate and output an IR signal based on internal information (S121)

Here, the internal information means information which the remote control device 200 already has. The internal information may include IR information and index information previously stored in the memory 270. Also, the internal information may further include information on the video input mode, received from the display device 100 and a button input history.

The information on the video input mode may mean a video input mode of the display device 100 received from the display device 100. Specifically, the remote control device 200 may periodically receive information on the video input mode of the display device 100 from the display device 100 while being connected to the display device 100 via Bluetooth. The remote control device 200 may obtain the video input mode of the display device 100 based on the information on the video input mode received from the display device 100.

The button input history may mean recording of input button information whenever each button provided in the remote control device 200 is input. The input button information may include a time at which each button is input, a type of the input button, and the like.

Next, a method for generating and outputting an IR signal using internal information in the remote control device 200 will be described with reference to FIG. 10.

Figure 10:
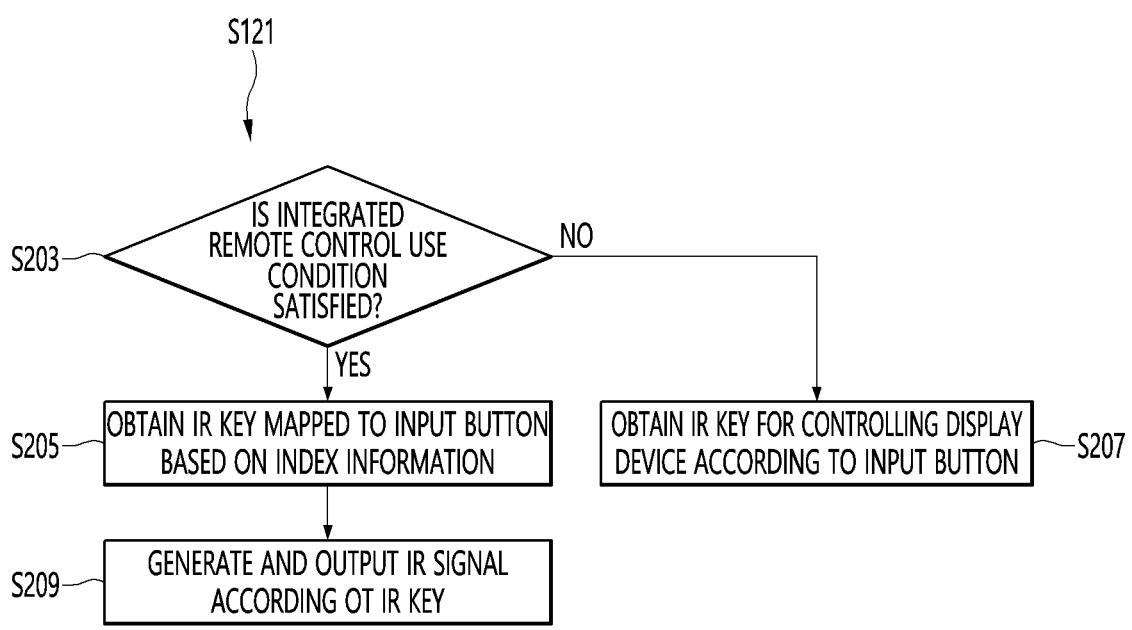
FIG. 10 is a flowchart illustrating a method for outputting an IR signal in a remote control device while Bluetooth connection with a display device is released according to an embodiment of the present disclosure.

FIG. 10 is a flowchart illustrating a method for outputting an IR signal in a remote control device while Bluetooth connection with a display device is released according to an embodiment of the present disclosure.

FIG. 10 is a flowchart illustrating a method for outputting an IR signal using internal information in a remote control device according to an embodiment of the present disclosure. FIG. 10 may be a flowchart in which step S121 of FIG. 7 is embodied.

The controller 280 may determine whether an integrated remote control use condition is satisfied (S203).

That is, the controller 280 may determine whether the integrated remote control use condition is satisfied based on a current video input mode of the display device 100.

For example, when the current video input mode of the display device 100 is an external input mode, the controller 280 may determine that the integrated remote control use condition is satisfied. When the current video input mode of the display device 100 is not the external input mode, the controller 280 may determine that the integrated remote control use condition is not satisfied.

That is, the controller 280 may determine whether the integrated remote control use condition is satisfied according to the current video input mode of the display device 100, and there are various methods for the determination, and an example thereof will be described with reference to FIG. 11.

FIG. 11 is a flowchart illustrating a method for a remote control device to determine whether an integrated remote control use condition is satisfied according to a video input mode of a display device according to an embodiment of the present disclosure.

FIG. 11 may be a flowchart in which step S203 of FIG. 10 is embodied.

The controller 280 may obtain the last video input mode (S301).

The last video input mode may mean a video input mode determined by the remote control device 200 based on information on the video input mode of the display device 100, which is most recently received from the display device 100.

The controller 280 may obtain the last video input mode based on the information on the video input mode of the display device 100 which is most recently received from the display device 100.

The controller 280 may obtain button information input after Bluetooth (BT) connection has been released (S303).

The controller 280 may extract the button information input after Bluetooth (BT) connection has been released, from a button input history.

The controller 280 may determine whether the vido input mode is changed based on the button information input after Bluetooth (BT) connection has been released (S305).

That is, when Bluetooth (BT) connection with the display device 100 is not established, the controller 280 may estimate the current video input mode based on the button input history. More specifically, the controller 280 may obtain the last video input mode, determine whether the video input mode is changed based on the button input history, and estimate the current video input mode of the display device 100 based on whether the video input mode is changed.

The controller 280 may determine whether the video input mode is changed based on whether a CP button, a direction key button, a home button, an OK button, a back button, or the like is input after Bluetooth (BT) connection has been released. Details will be described with reference to various examples shown in FIGS. 12 to 14.

The controller 280 may obtain the current video input mode of the display device 100 based on whether the video input mode is changed (S307).

For example, when determining that the video input mode is changed while the last video input mode is the external input mode, the controller 280 may determine that the current video input mode is not the external input mode. Conversely, when determining that the video input mode is not changed while the last video input mode is the external input mode, the controller 280 may determine that the current video input mode is continuously the external input mode.

As another example, when determining that the video input mode is changed while the last video input mode is not the external input mode, the controller 280 may determine that the current video input mode is the external input mode. Conversely, when determining that the video input mode is not changed while the last video input mode is not the external input mode, the controller 280 may determine that the current video input mode is not the external input mode.

The controller 280 may determine whether an integrated remote control use condition is satisfied based on the current video input mode (S309).

That is, the controller 280 may determine that the integrated remote control use condition is satisfied when it is determined that the current video input mode of the display device 100 is the external input mode, and may determine that the integrated remote control use condition is not satisfied when it is determined that the current video input mode of the display device 100 is not the external input mode.

Again, description will be given with reference to FIG. 10.

The controller 280 may determine whether the integrated remote control use condition is satisfied, and when the integrated remote control use condition is satisfied, obtain an IR key mapped to an input button based on the index information (S205).

That is, in a case where Bluetooth connection with the display device 100 is not established, the controller 280 may obtain from the IR information, an IR key corresponding to the input button based on the index information when the current video input mode of the display device 100 is an external input mode.

For example, when the integrated remote control use condition is satisfied, the controller 280 may obtain the IR key mapped to button "1" from the IR information on an external device according to the index information in a case where the input button is button "1".

On the other hand, the controller 280 may determine whether the integrated remote control use condition is satisfied and when the integrated remote control use condition is not satisfied, obtain an IR key for controlling the display device 100 according to the input button (S207).

That is, when the current video input mode of the display device 100 is not the external input mode, the controller 280 may obtain an IR key for outputting an IR signal for controlling the display device 100.

The remote control device 200 may store IR information on the display device 100 as well as IR information on the external device in the memory 270. Accordingly, when the integrated remote control use condition is not satisfied, the controller 280 may obtain an IR key corresponding to the input button from the IR information on the display device 100.

The controller 280 may generate and output an IR signal according to the IR key obtained in step S205 or step S207 (S209).

Accordingly, when a button is input while the Bluetooth connection with the display device 100 is released, the remote control device 200 may output an RI signal for controlling the external device when the current video input mode of the display device 100 is the external input mode, and output an RI signal for controlling the display device 100 when the current video input mode of the display device 100 is not the external input mode. That is, the controller 280 may determine whether a control target of the remote control device 200 is the display device 100 or an external device based on the current video input mode of the display device 100, and generate an IR signal according to the determination, thus minimizing the problem of inability to control the remote control device 200.

Next, various examples in which the remote control device 200 determines whether the video input mode is changed based on a button input history and determines whether an integrated remote control use condition is satisfied will be described with reference to FIGS. 12 to 14.

FIG. 12 is a diagram illustrating a first example in which a remote control device determines whether a video input mode is changed and whether an integrated remote control use condition is satisfied based on a button input history, according to an embodiment of the present disclosure.

The controller 280 may recognize the last video input mode as an external input mode. For example, the display device 100 may display a set-top box image input through the external device interface 135.

The controller 280 may detect the input of a CP button after Bluetooth (BT) connection has been released.

The CP button may be a button provided in the remote control device 200 to switch to an application, a website, or the like for enabling a user to view content provided by a content provider (CP).

When the controller 280 detects the input of the CP button while the last video input mode is an external input mode, the controller 280 may determine that the video input mode is changed. A video provided by the CP is a video received through the network interface 133 and may be a video directly provided by the display device 100.

Accordingly, the controller 280 may determine that the current video input mode of the display device 100 is not the external input mode and accordingly determine that the integrated remote control use condition is not satisfied.

Figure 13:
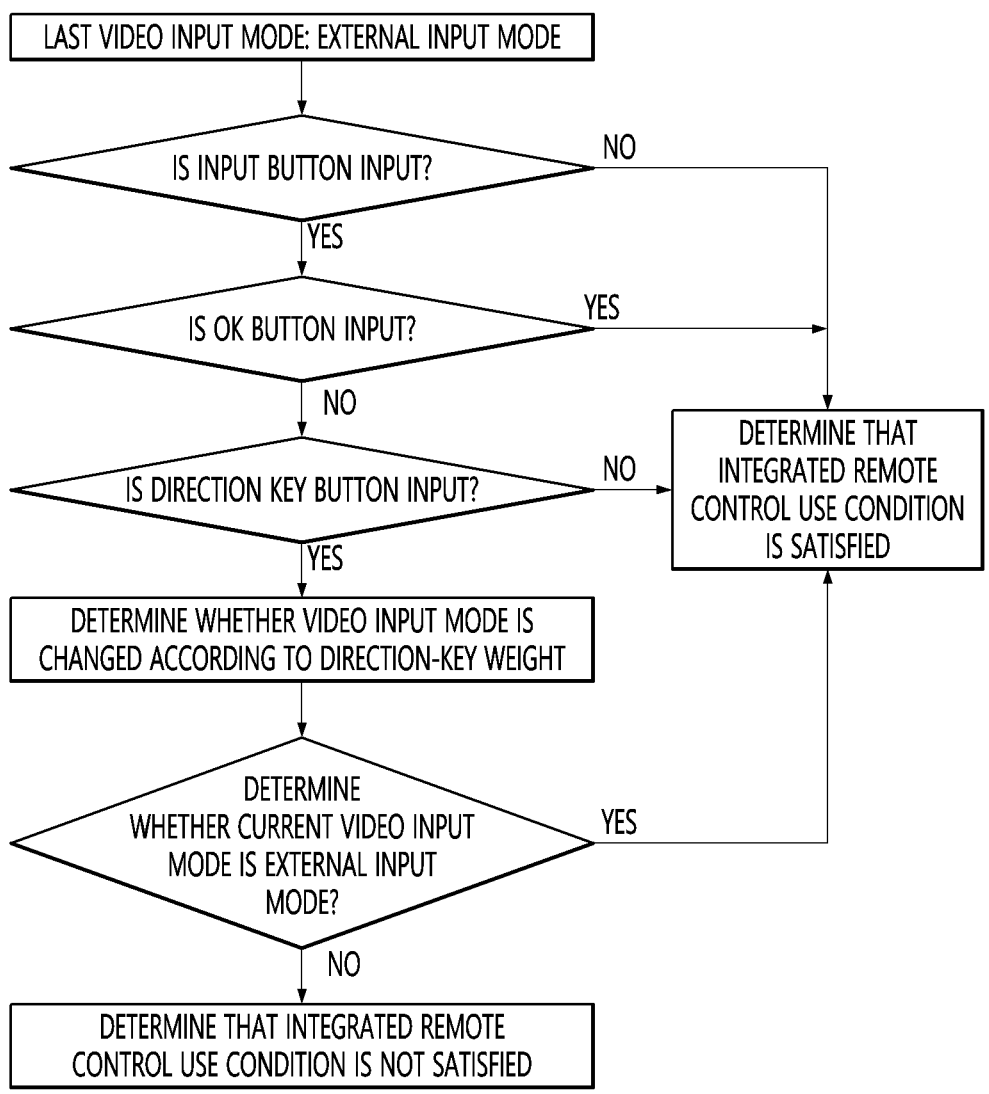
FIG. 13 is a diagram illustrating a second example in which a remote control device determines whether a video input mode is changed and whether an integrated remote control use condition is satisfied based on a button input history, according to an embodiment of the present disclosure.

FIG. 13 is a diagram illustrating a second example in which a remote control device determines whether a video input mode is changed and whether an integrated remote control use condition is satisfied based on a button input history, according to an embodiment of the present disclosure.

The controller 280 may recognize the last video input mode as an external input mode. For example, the display device 100 may be displaying a video of a set-top box input through the external device interface 135.

The controller 280 may detect whether an input button is input after Bluetooth (BT) connection has been released.

The input button may be a button provided in the remote control device 200 to switch to a screen for setting a video input mode.

When the input of the input button is not detected, the controller 280 may determine that the current video input mode of the display device 100 is continuously the external input mode, and thus may determine that the integrated remote control use condition is satisfied.

Meanwhile, the controller 280 may detect whether an OK button is input after the input button has been input. When the input of the OK button is detected immediately after the input button has been input, the controller 280 may may determine that the integrated remote control use condition is satisfied because switching is performed from a screen for setting the video input mode back to the video of the set-top box.

The controller 280 may detect whether a back direction key button is input after the input button has been input. When the OK button or the direction key button is not input, the controller 280 may continuously determine that the integrated remote control use condition is satisfied.

When the input of a direction key button is detected after the input button has been input, the controller 280 may calculate a direction-key weight and determine whether the video input mode is changed based on the calculated direction-key weight. For example, the controller 280 may calculate the direction-key weight in a manner of adding (−1) whenever the left arrow button is input and adding (+1)

whenever the right arrow button is input. When the calculated direction-key weight has 0, the controller 280 may determine that the video input mode is not changed, and when the calculated direction-key weight has a value other than zero, the controller 280 may determine that the video input mode has changed. As a similar example, the controller 280 may calculate the direction-key weight in a manner of adding (−1) whenever the down arrow button is input and adding (+1) whenever the up arrow button is input. When the calculated direction-key weight has 0, the controller 280 may determine that the video input mode is not changed, and when the calculated direction-key weight has a value other than zero, the controller 280 may determine that the video input mode has changed.

The controller 280 may determine whether the current video input mode is an external input mode based on whether the video input mode is changed. Specifically, the controller 280 may determine that the current video input mode is not the external input mode when it is determined that the video input mode is changed while the last video input mode is the external input mode, and determine that the current video input mode is the external input mode when it is determined that the video input mode is not changed while the last video input mode is the external input mode.

The controller 280 may determine whether the current video input mode is the external input mode.

The controller 280 may determine that the integrated remote control use condition is satisfied when it is determined that the current video input mode is the external input mode, and may determine that the integrated remote control use condition is not satisfied when it is determined that the current video input mode is not the external input mode.

Figure 14:
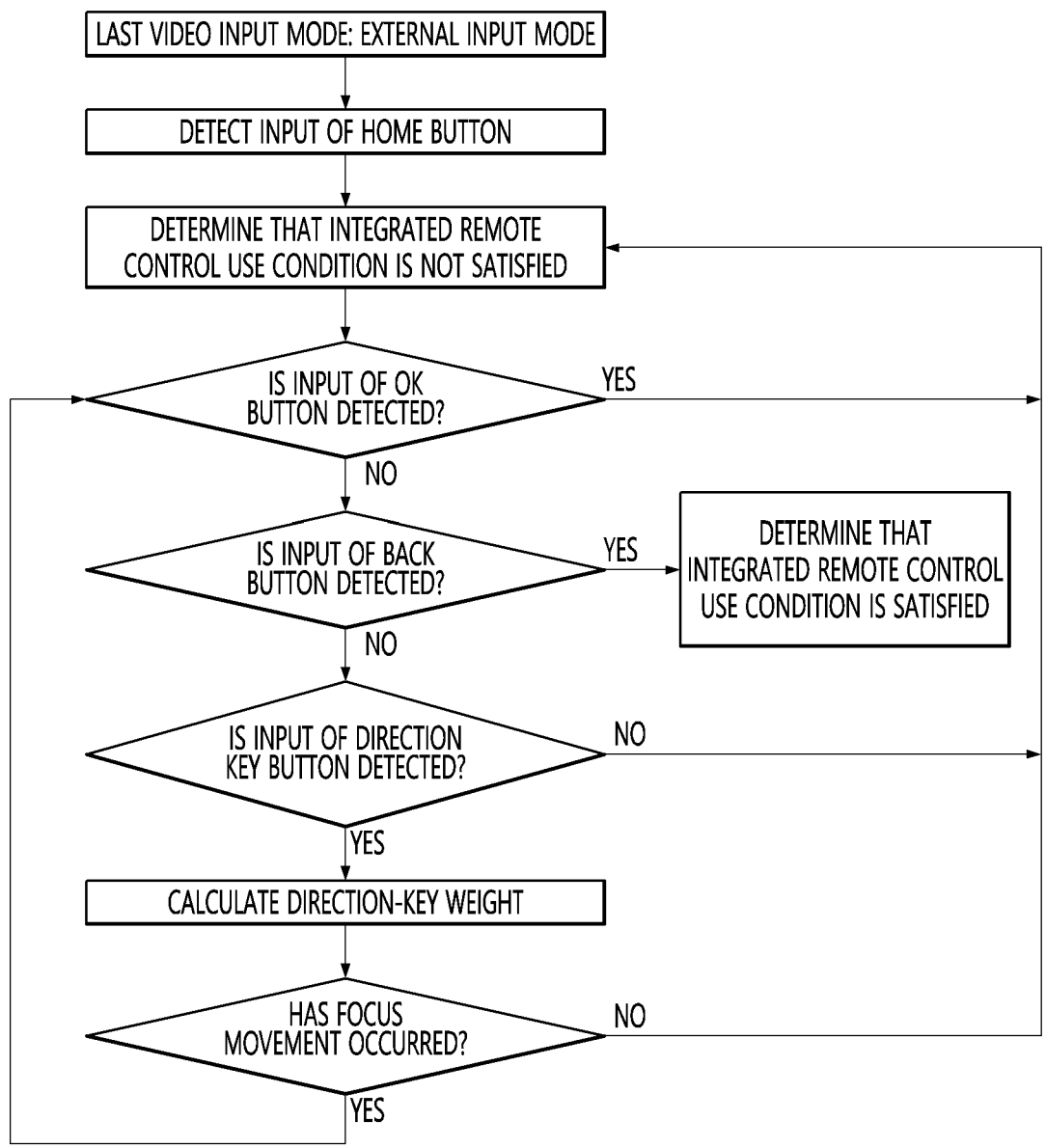
FIG. 14 is a diagram illustrating a third example in which a remote control device determines whether a video input mode is changed and whether an integrated remote control use condition is satisfied based on a button input history, according to an embodiment of the present disclosure.

FIG. 14 is a diagram illustrating a third example in which a remote control device determines whether a video input mode is changed and whether an integrated remote control use condition is satisfied based on a button input history, according to an embodiment of the present disclosure.

The controller 280 may recognize the last video input mode as an external input mode. For example, the display device 100 may be displaying the video of a set-top box through the external device interface 135.

The controller 280 may detect whether a home button is input after Bluetooth (BT) connection has been released.

The home button may be a button provided in the remote control device 200 to switch to a main screen of the display device 100. The main screen of the display device 100 is a screen provided by the display device 100 and may not correspond to an external input mode.

When the input of the home button is detected, the controller 280 may determine that the integrated remote control use condition is not satisfied.

The controller 280 may detect whether the OK button is input while the main screen of the display device 100 is displayed.

When the controller 280 detects an input of the OK button immediately after the controller 280 has been switched to the main screen of the display device 100, the controller 280 may switch to a specific screen provided on the main screen of the display device 100, which does not correspond to an external input mode, so that the controller 280 may determine that the integrated remote control use condition is not satisfied.

The controller 280 may detect whether the back button is input in the state of being switched to the main screen of the display display 100.

Since the video of the set-top box that had been previously displayed is displayed when the back button is input in the state of being switched to the main screen of the display device 100, the controller 280 may determine that the current video input mode has been changed to the external input mode and determine that the integrated remote control use condition is satisfied.

The controller 280 may detect whether the direction key button is input while the controller 280 is switched to the main screen of the display display 100. Since the main screen of the display device 100 is continuously displayed while the direction key button is not input, the controller 280 may determine that the integrated remote control use condition is not satisfied.

The controller 280 may calculate a direction-key weight when the direction key button is input in a state of being switched to the main screen of the display device 100. Since the method of calculating the direction-key weight has already been described with reference to FIG. 13, the overlapping description will be omitted.

The controller 280 may determine whether focus movement has occurred according to the direction-key weight. A focus refers to an area to be selected, and may be moved according to the input of the direction key button.

Since the main screen of the display device 100 is continuously displayed when the focus movement have not occurred, the controller 280 may determine that the integrated remote control use condition is not satisfied The controller 280 may again determine whether the OK button is input when the focus movement has occurred.

Figure 15:
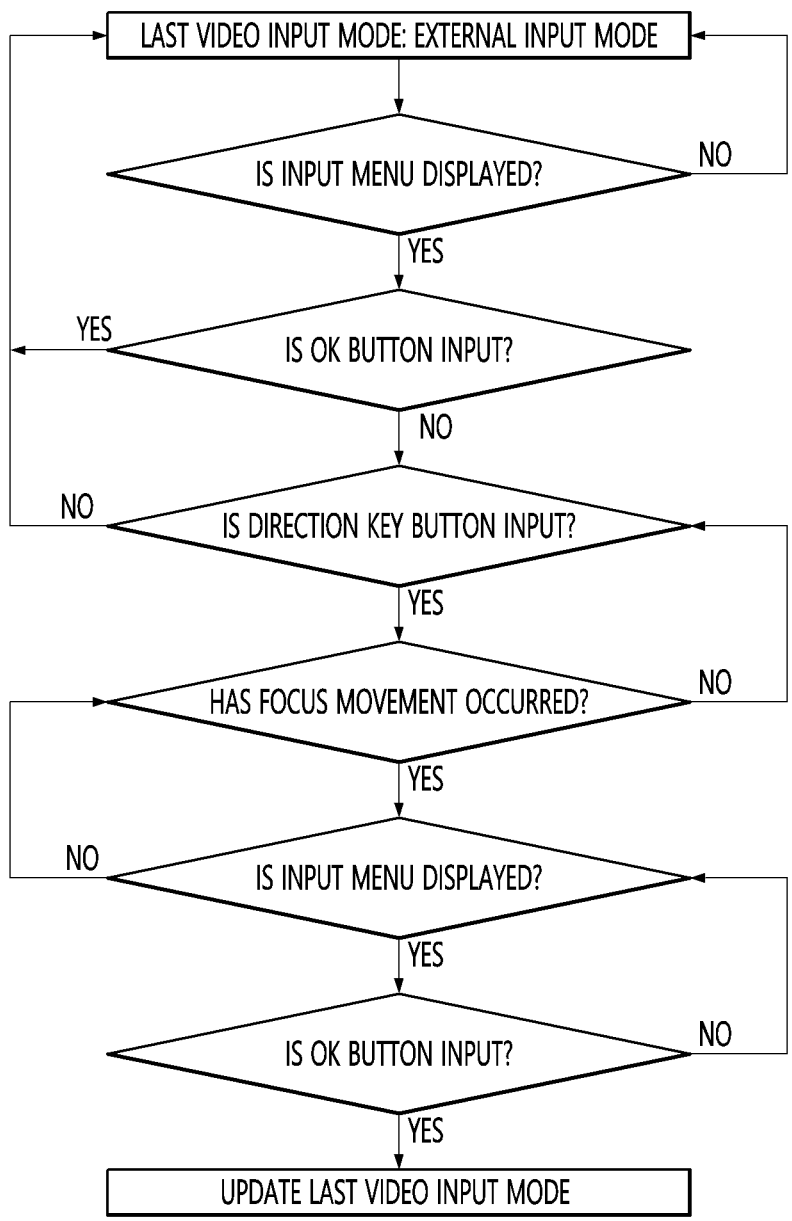
FIG. 15 is a diagram illustrating an example in which a display device updates a last video input mode based on the input of a button of a remote control device according to an embodiment of the present disclosure.

FIG. 15 is a diagram illustrating an example in which a display device updates a last video input mode based on the input of a button of a remote control device according to an embodiment of the present disclosure.

The controller 170 may recognize the last video input mode as an external input mode. For example, the controller 170 may display a video which is input through HDMI 1, the video being a video input through the external device interface 135, and the controller 170 may be in an external input mode.

The controller 170 may determine whether the input menu is displayed. The input menu is a menu displayed when an input button provided in the remote control device 200 is input, and may be a menu included in a screen for setting a video input mode.

When the input menu is not displayed, the controller 170 may continuously recognize an external input mode as the video input mode.

When the input menu is displayed, the controller 170 may detect whether the OK button is input. The controller 170 may continuously recognize the external input mode as the last video input mode when the OK button is input immediately while the input menu is displayed.

The controller 170 may detect whether a direction key button is input while the input menu is displayed. The controller 170 may continuously recognize the external input mode as the last video input mode when the direction key button is not input while the input menu is displayed. When the direction key button is input while the input menu is displayed, the controller 170 may calculate a direction-key weight and determine whether focus movement has occurred.

When the focus movement has not occurred, the controller 170 may continuously detect whether the direction key button is input. The controller 170 may determine whether the input menu is continuously displayed when the focus movement has occurred, determine that the video input mode has been changed when the OK button is input while the input menu is continuously displayed, and accordingly, update the last video input mode to be not the external input mode. In this case, the display 180 may display another video (e.g., live TV, other HDMI, CP application, or the like).

As described above, the remote control device 200 and the display device 100 may estimate the current video input mode of the display device 100 based on the last video input mode and the input button history. On the other hand, since the above-described examples are only for description, it is appropriate that the present disclosure is not limited thereto.

According to the present disclosure, the remote control device 200 can control not only the display device 100 but also an external device connected to the display device 100 when the wireless environment is poor, thereby enhancing the operational stability of the integrated remote control function.

According to an embodiment of the present disclosure, the remote control device outputs an IR signal for controlling the display device or an external device connected to the display device according to the video input mode of the display device, thereby minimizing the inoperability of the remote control device even when Bluetooth connection with the display device is not smooth.

According to an embodiment of the present disclosure, the remote control device can output an IR signal for controlling the external device by including index information in which not only IR information on external devices but also each button is mapped to an IR key of the IR information, even when connection with the display device is not established, thereby strengthening the operation stability of the remote control device.

According to an embodiment of the present disclosure, since the current video input mode of the display device is determined based on the button input history, it is possible to more accurately estimate the target device that the user wants to control, and thus minimize the malfunction of the integrated remote control function.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The above-described display device is not limited to the configuration and method of the above-described embodiments, but the embodiments may be configured by selectively combining all or part of each embodiment such that various modifications can be made.

What is claimed is:

1. A remote control device for transmitting and receiving a control signal to and from a display device, comprising:
    a Bluetooth circuit configured to establish Bluetooth connection with the display device;
    an infrared (IR) circuit configured to output an IR signal; and
    a controller configured to:
    receive IR information related to controlling an external device connected to the display device;
    receiving an input to a button of the remote control device;
    determining whether the Bluetooth connection is established with the display device;
    based on a determination that the Bluetooth connection with the display device is not established, outputting a first IR signal for controlling the external device corresponding to the input button based on determining that a current video input mode of the display device is an external device input mode using a button input history stored in a memory of the remote control device; and
    based on a determination that the Bluetooth connection with the display device is established:
    transmitting, to the display device via the Bluetooth connection, information on the input button;
    receiving, from the display device via the Bluetooth connection, an IR key corresponding to the input button; and
    outputting a second IR signal according to the received IR key for controlling the external device when the current video input mode of the display device is the external device input mode.

2. The remote control device of claim 1, wherein the memory is further configured to store index information in which IR information on the external device and buttons of the remote control device are respectively mapped to IR keys of the IR information.

3. The remote control device of claim 2, wherein the first IR signal is output according to an IR key included in the IR information corresponding to the input button based on the index information.

4. The remote control device of claim 1, wherein the controller is further configured to output a third IR signal for controlling the display device corresponding to the input button when the current video input mode of the display device is not the external input mode.

5. The remote control device of claim 1, wherein the controller is further configured to:
    determine a last known video input mode based on information on video input mode information most recently received from the display device; and
    determine whether the last known video input mode has been changed based on the button input history stored in the memory.

6. The remote control device of claim 5, wherein the controller is further configured to:
    calculate a direction-key weight value based on the button input history; and
    determine that the last known video input mode has been changed when the direction key weight value is non-zero, and that the last known video input mode has not been changed when the direction key weight value is zero.

7. A display system comprising:
    a display device; and
    a remote control device configured to transmit and receive a control signal to and from a display device,
    wherein the remote control device is configured to:
    receive IR information related to controlling an external device connected to the display device;
    receive an input to a button of the remote control device;
    determine whether a Bluetooth connection is established with the display device; and
    based on a determination that the Bluetooth connection with the display device is not established, outputting a first IR signal for controlling the external device corresponding to the input button based on determining that a current video input mode of the display device is an external device input mode using a button input history stored in a memory of the remote control device, wherein based on a determination that the Bluetooth connection is established:

the remote control device is further configured to transmit, to the display device via the Bluetooth connection, information on the input button;

the display device is further configured to transmit, to the remote control device via the Bluetooth connection, an IR key corresponding to the input button; and the remote control device is further configured to output a second IR signal according to the received IR key for controlling the external device when the current video input mode of the display device is the external device input mode.

8. The display system of claim 7, wherein the display device is configured to transmit, to the remote control device, index information in which IR information on the external device and buttons of the remote control device are respectively mapped to IR keys of the IR information.

9. The display system of claim 8, wherein the first IR signal is output according to an IR key included in the IR information corresponding to the input button based on the index information.

10. The display system of claim 8, wherein the remote control device is further configured to output a third IR signal for controlling the display device corresponding to the input button when the current video input mode of the display device is not the external input mode.

* * * * *